US010484446B1

(12) United States Patent
Waggoner et al.

(10) Patent No.: US 10,484,446 B1
(45) Date of Patent: Nov. 19, 2019

(54) VBR ENCODING OF LIVE CONTENT

(71) Applicant: Amazon Technologies, Inc., Seattle, WA (US)

(72) Inventors: Charles Benjamin Franklin Waggoner, Portland, OR (US); Marc Joliveau, Seattle, WA (US); Stefan Christian Richter, Seattle, WA (US); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 300 days.

(21) Appl. No.: 15/421,145

(22) Filed: Jan. 31, 2017

(51) Int. Cl.
| H04L 29/06 | (2006.01) |
| H04L 29/08 | (2006.01) |
| H04N 21/2187 | (2011.01) |
| H04N 21/858 | (2011.01) |
| H04N 21/6373 | (2011.01) |
| H04L 12/801 | (2013.01) |

(52) U.S. Cl.
CPC ........ H04L 65/607 (2013.01); H04L 29/0651 (2013.01); H04L 29/06176 (2013.01); H04L 29/06482 (2013.01); H04L 47/10 (2013.01); H04L 65/601 (2013.01); H04L 65/80 (2013.01); H04L 67/02 (2013.01); H04N 21/2187 (2013.01); H04N 21/6373 (2013.01); H04N 21/858 (2013.01)

(58) Field of Classification Search
CPC ......... H04L 29/06176; H04L 29/06448–0651; H04L 29/06523; H04L 47/10; H04L 65/00; H04L 65/4069–607; H04L 65/80; H04N 21/2343; H04N 21/6373; H04N 21/6377; H04N 21/6379; H04N 21/64738
See application file for complete search history.

(56) References Cited

U.S. PATENT DOCUMENTS

| 8,862,763 | B2 | 10/2014 | Adimatyam et al. | |
| 8,874,779 | B2* | 10/2014 | Ma | H04N 21/44209 709/200 |
| 8,990,351 | B2* | 3/2015 | Isaksson | H04L 47/2416 709/219 |
| 9,237,387 | B2* | 1/2016 | Bocharov | H04N 21/4331 |
| 9,516,085 | B2* | 12/2016 | McCarthy | H04N 21/8456 |
| 9,641,578 | B2* | 5/2017 | Wheelock | H04L 65/4076 |
| 2002/0131496 | A1 | 9/2002 | Vasudevan et al. | |
| 2005/0246451 | A1* | 11/2005 | Silverman | G11B 27/034 709/231 |
| 2010/0091888 | A1* | 4/2010 | Nemiroff | H04N 21/23655 375/240.28 |
| 2010/0312828 | A1* | 12/2010 | Besserglick | H04L 65/602 709/203 |
| 2010/0318600 | A1* | 12/2010 | Furbeck | H04L 65/4084 709/203 |
| 2011/0252082 | A1* | 10/2011 | Cobb | H04L 65/605 709/203 |

(Continued)

OTHER PUBLICATIONS

U.S. Appl. No. 15/421,143, filed Jan. 31, 2017, Waggoner et al.
U.S. Notice of Allowance dated Feb. 14, 2019 issued in U.S. Appl. No. 15/421,143.

*Primary Examiner* — Brendan Y Higa
(74) *Attorney, Agent, or Firm* — Weaver Austin Villeneuve & Sampson LLP (57) ABSTRACT

Techniques are described that enable the use of variable bit rate (VBR) encoding for live content.

23 Claims, 5 Drawing Sheets

(56) References Cited

U.S. PATENT DOCUMENTS

| | | |
|---|---|---|
| 2012/0005368 A1 | 1/2012 | Knittle |
| 2013/0051768 A1 | 2/2013 | Soroushian et al. |
| 2014/0082192 A1* | 3/2014 | Wei .................. H04W 28/0231 |
| | | 709/224 |
| 2014/0201382 A1 | 7/2014 | Shivadas et al. |
| 2014/0294096 A1 | 10/2014 | Togo |
| 2015/0006621 A1 | 1/2015 | Westphal |
| 2015/0365450 A1 | 12/2015 | Gaunt et al. |
| 2016/0127260 A1* | 5/2016 | Gordon ................. H04L 47/783 |
| | | 709/226 |
| 2016/0182941 A1 | 6/2016 | Crabtree et al. |
| 2017/0171577 A1 | 6/2017 | Kipp |
| 2018/0063536 A1 | 3/2018 | Carmel et al. |
| 2018/0183845 A1 | 6/2018 | Coward et al. |
| 2018/0205778 A1* | 7/2018 | Forman ................. H04L 65/607 |

\* cited by examiner

VBR ENCODING OF LIVE CONTENT

BACKGROUND

Consumers have an ever-increasing array of options for consuming media content, in terms of the types of media content (e.g., video, audio, text, etc.), providers of the media content, and devices for consuming the media content. Media content providers are becoming increasingly sophisticated and effective at optimizing the quality of the media content provided.

Live streaming media content includes channels or feeds with live events (e.g., real-time or near real-time sporting events, news, concerts, etc.) or scheduled broadcasts of pre-recorded content. Media content encoded with variable average bit rates or variable fragment lengths have variable fragment sizes. Thus, fragment sizes generated by variable bit rate or variable fragment length encoders cannot be predicted in advance for ongoing live event media content.

Unfortunately, updates of manifest data to provide newly encoded fragment sizes for quality optimization algorithms complicate infrastructure requirements and increase cost of delivery.

DETAILED DESCRIPTION

This disclosure describes techniques for delivery of variable bit rate encoded live streaming media content.

These techniques include generating manifest data for multiple representations (i.e., encodings) of the media content that indicate the format of requests for fragments associated with each representation, including fragments that are yet to be encoded and available for playback (i.e., media content segments that will be encoded into fragments in the future as the live event progresses).

These techniques further involve identifying each instance of when two fragments having different quality levels represent the same segment of media content, and the higher quality fragment conforms to constraints associated with the lower quality fragment. That is, for example, if the higher quality fragment fits within the variable bit rate cap of the lower quality representation, the higher quality fragment is used to service requests for the corresponding segment at the lower quality representation. Therefore, the viewer device receives the highest quality fragment available without exceeding the network and buffer limitations corresponding to the request.

Capped variable bit rate (CVBR) encoding is a type of variable bit rate encoding in which the maximum/peak bit rate allowed is one of the constraints. Encoding media content with the bit rate capped at 10 Mbps often produces a fragment of higher perceived quality than one encoded at a constant average bit rate of 10 Mbps. This is because the CVBR fragment can use data bits it saved during the simpler passages to add extra data bits to the more complex passages to improve the overall media content encoding quality. Similarly, encoding media content with the bit rate capped at 10 Mbps often produces a fragment of higher perceived quality than one encoded at a lower cap value, for example, 7 and 3 Mbps. Therefore, the cap value can serve as a proxy for VBR encoded fragment quality.

Capped variable bit rate encoding, whether applied to video-on-demand (VOD) media content or live streaming media content, results in variable fragment sizes that cannot be accurately predicted in advance (i.e., deterministically). Put alternatively, the actual fragment size, actual fragment peak bit rate, and actual fragment average bit rate of CVBR encoded fragments are stochastic fragment characteristics (i.e., characteristics not known prior to fragment encoding, and thus are not deterministic constraints). For VOD media content, such as a Hollywood movie or a replay of a videogame competition, viewer devices request content after the entire media content has been encoded. Thus, a VOD manifest file indicating video fragment locations, such as with URLs, can directly or indirectly incorporate stochastic fragment characteristics relating to fragment file sizes and fragment lengths in a static manifest file.

In contrast, live event media content is typically requested by the viewer device in near real time. Manifest data generated for the live stream of the media content includes location data representing fragments that are yet to be encoded and so are not yet available for playback (i.e., fragments that will be available in the future as the live event progresses). For example, as the fragments are encoded, they may have a predictable name or timing conventions that can be detailed, or predicted, ahead of time as in VOD-style manifest files. However, as mentioned above, characteristics such as fragment file sizes for fragments that have not yet been encoded using VBR (because they correspond to events in real time that are still in the future) are stochastic, even if the duration of the live event is predetermined (e.g., a ninety minute live concert, a twelve hour Olympic live broadcast, etc.).

The present disclosure describes how adaptive streaming of live event media content can be facilitated despite the stochastic characteristics of encoded fragments. These techniques include identifying when two fragments having different quality levels (e.g., different capped VBR peak bit rate levels) represent the same segment of live event media content, and the fragment from the higher quality representation falls within the cap value associated with the lower quality representation.

In some implementations, the higher quality fragment is stored and propagated through a content delivery system using locations, filenames, and indexing that correspond to the lower quality fragment. In such an instance, if a viewer device requests the corresponding fragment from the lower quality representation in accordance with a fragment request schema, the higher quality fragment is provided instead.

In other implementations, the higher quality fragment is provided in response to a request for the corresponding fragment from the lower quality representation by using request resolution data that explicitly establishes the relationship between the higher quality fragment and the request for the corresponding fragment from the lower quality representation. Furthermore, since the lower quality fragment has been rendered obsolete by the higher quality fragment, storage (e.g., storing at an origin server) and content delivery system distribution (e.g., propagating the lower quality fragment to edge servers, proxy caches, etc.) of the lower quality fragment may be eliminated.

Figure 1:
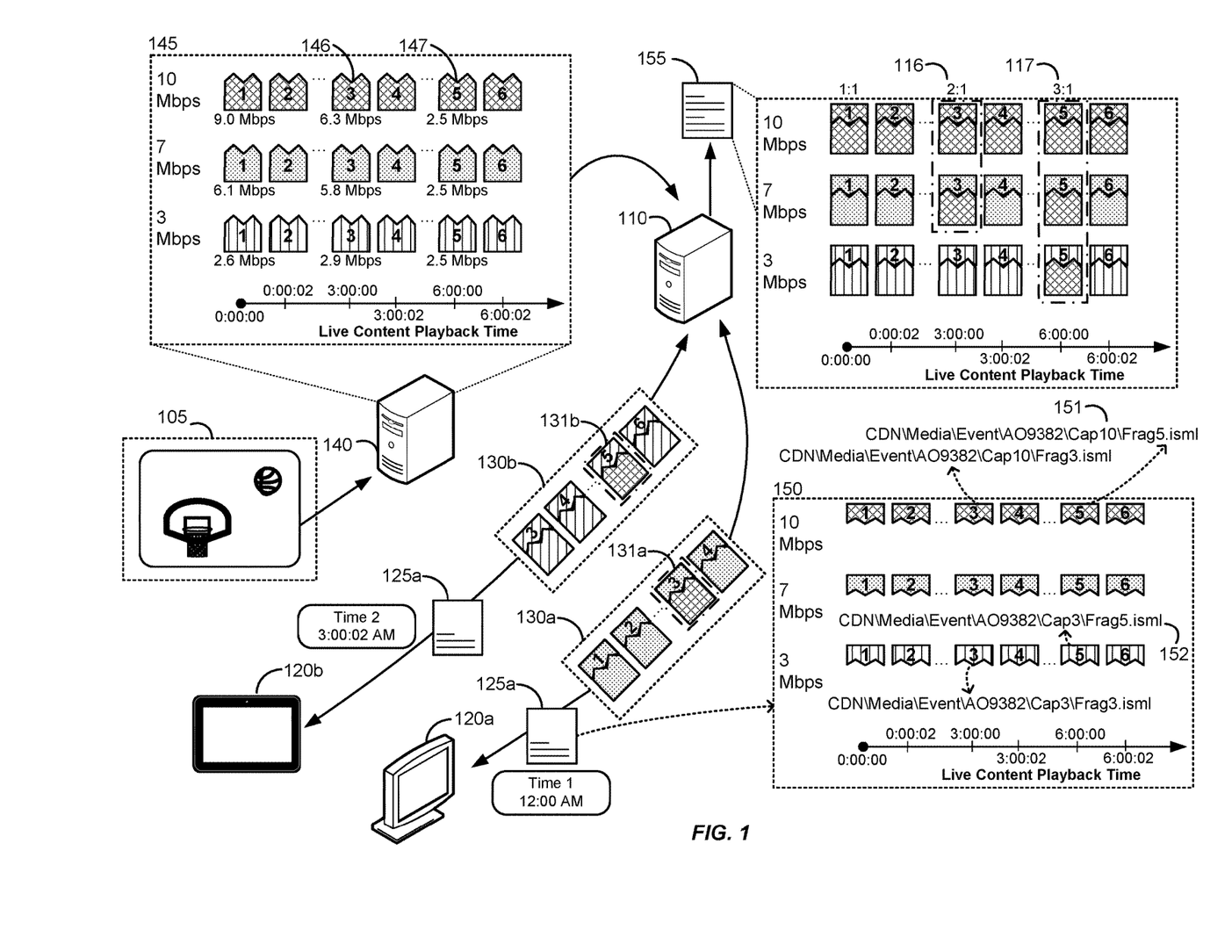
FIG. 1 illustrates an example of providing live streaming media content using VBR.

FIG. 1 illustrates an example of providing live media content as described herein. Viewer devices 120a and 120b are electronic devices (a television and a tablet, respectively) that are provided manifest data 125a to request fragments 130a and 130b, respectively, from among fragments 145 from media server 110 to enable playback of a live stream of media content 105.

Media content 105 is a live event (e.g., an Olympic broadcast that is live or near-live over the Internet or other networks) available for live streaming playback. As the live event is recorded, fragment server 140 receives video data, encodes that data at various video quality representations (e.g., CVBR cap levels 10, 7, 3 Mbps), and generates encoded fragments 145. Manifest data 125a indicates a schema for requesting encoded fragments 145. For example, in manifest data 125a, the first fragment is indicated by index 1, corresponding to the beginning of the duration of the playback. Subsequent fragments are requested by incrementing the index code.

As an example, if each fragment has a fixed fragment length and provides two seconds of playback, then the second fragment to be requested would have an index of 2, corresponding to a time code associated with 0 hours, 0 minutes, 2 seconds. The final fragment would have an index of 21800, and correspond to playback from 5 hours, 58 minutes, 58 seconds to 6 hours, 0 minutes, 0 seconds. In other implementations, the index is a time code or time range for the fragment.

Fragment server 140 uses variable bit rate encoding, which provides fragment size advantages relative to constant bit rate encoding. Constant bit rate (CBR) encoding attempts to maintain a constant average bit rate for the entire media content. CBR is not optimal as it can waste valuable data bits encoding simple sections of media content. Conversely, CBR may not use a sufficient number of bits on more complex portions of the media content, resulting in poorer quality during those portions. Constant bit rates are easier and therefore faster to encode compared to variable bit rates and lead to consistent and predictable file sizes.

Variable bit rate (VBR) encoding analyzes the media content and adapts the bit rate to match the complexity of the media content being encoded. For simple media content passages, the system automatically turns the bit rate down, saving data bits, while retaining the perceived quality. Conversely, during more complex passages, the system turns the bit rate up, using more data bits to retain the same level of quality. Using this method, the average quality is increased as the available data bits are used more flexibly to encode the media content data. Compared to CBR, VBR produces smaller file sizes for a given media content quality. However, as the bit rates are variable, it is difficult to predict the size of VBR fragments in advance. In addition, VBR fragments are harder to encode compared to CBR, as the adaptive encoding process is more complex and processor intensive.

CBR and VBR are both interframe compressed video codecs, and thus both are variable in that not every frame uses the same number of bits as every other frame in the fragment. However, a CBR codec will vary quality in order to maintain an approximately constant bitrate, and a VBR codec will vary bitrate in order to maintain quality. Capped VBR (CVBR) is a type of VBR encoding where one of the constraints is the peak, constrained, or cap bit rate value, which specifies the maximum bit rate allowed, which may differ from the actual maximum bit rate of the fragment outputted. Typically, a fragment encoded with a higher cap value is of higher playback quality relative to a fragment encoded with a lower cap value. Thus, the constraint represented by the cap value can be used as a proxy for quality.

While the discussion of FIG. 1 refers to different cap values to differentiate the quality of multiple representations of the same media content, other proxies for fragment quality can be used. These include, for example, fragment sizes for a fixed fragment length, fragment sizes for a known variable fragment length, or fragment average bit rate.

Fragments 145 represent encodings of video segments 1-6 of live media content 105 available at three different quality levels based on capped bitrates for the respective representations. A sequence of fragments together enables playback of a portion of live media content 105. In FIG. 1, a single fragment might provide 2 seconds of video playback for a live stream though in other implementations the duration of playback provided by a fragment may differ. Fragments for audio can also be generated, as well as subtitles and other playback options.

In fragments 145, an encoded video fragment is represented by a sawtooth icon. A group of sawtooth icons with the same fill pattern is an abstraction of a sequence of video fragments corresponding to an encoding of segments of media content 105 at a particular quality level. For example, fragments 145 include sawtooth icons with three different fill patterns (crosshatching, dotted, and vertical lines), which depict fragments that contain three different representations of the same segments of media content 105, each representation being of a different quality level. Specifically, crosshatching corresponds to a CVBR cap of 10 Mbps, dotted corresponds to a CVBR cap of 7 Mbps, and vertical lines corresponds to a CVBR cap of 3 Mbps.

Fragment 146, corresponding to segment 3 of media content 105 encoded at a CVBR cap of 10 Mbps, has an actual peak bit rate of 6.3 Mbps. The CVBR cap value is a deterministic constraint, since the fragment will be known to have that constraint prior to encoding (i.e., all fragments encoded with a CVBR cap of 10 Mbps will have a maximum allowable peak bit rate of 10 Mbps). In contrast, the actual peak bit rate is a stochastic fragment characteristic, since the actual peak bit rate will be unknown prior to encoding (i.e., all fragments encoded with a CVBR cap of 10 Mbps will have an unknown actual peak bit rate that is a value less than 10 Mbps). In this example, the segment encoded at CVBR 10 Mbps is within the constraints of the lower quality CVBR 7 Mbps encoding. Specifically, the peak bit rate of 6.3 Mbps is lower than the constraint of 7 Mbps. Thus, if a viewer device requests the lower quality CVBR 7 Mbps encoding, media server 110 can provide the segment encoded at CVBR 10 Mbps without exceeding the network bandwidth and buffer limitations associated with CVBR 7 Mbps, since 6.3 is less than 7.

Similarly, fragment 147, corresponding to segment 5 encoded at a CVBR cap of 10 Mbps, has peak bit rate of 2.5 Mbps. Thus, a segment encoded at CVBR 10 Mbps falls within the constraints associated with both the CVBR 7 and 3 Mbps encodings. Specifically, the actual peak bit rate of 2.5 Mbps is lower than the constraint of 7 and 3 Mbps maximum allowable peak bit rate, respectively. Such a scenario might occur when the segment contains low complexity or static content, such as simple animation or still scenes.

In both scenarios, when a higher quality fragment falls within the constraints corresponding to a lower quality encoding, the higher quality fragment is provided to a viewer device that requested the corresponding fragment from the lower quality representation. As a result, a higher-quality viewing experience is provided.

The sawtooth icons in fragments 145 represent fragments, either as discrete files or byte ranges within files, that are either stored at fragment server 140, media server 110, or distributed in a content delivery system.

Media server 110 generates manifest data 125a to allow for viewer devices 120a and 120b to view the live stream. The manifest data (e.g., one or more markup files, other types of data structures, data provided over an API, etc.), provide playback options for the live stream by providing metadata that allows a viewer device to generate properly formatted requests for specific fragments of the media content. The viewer devices use the manifest data to generate a uniform resource locator (URL) directed to media server 110 and include, for example, a query string indicating the specific fragments to be provided by media server 110. As will be appreciated, such a request may be directed to a server other than media server 110, or a plurality of media servers. The URL is formatted based on a schema indicated by the manifest data 125a. For example, the schema may be represented as a template describing an HTTP request where different strings within the HTTP address specify parameters such as the host, channel, quality level (e.g., CVBR cap), fragment index, byte range, or time range being requested.

One example of a request is request 151, shown within fragment requests 150, corresponding to a fragment for segment 5 encoded with a CVBR cap of 10 Mbps. The query string for request 151 is: "CDN\Media\Event\AO9382\Cap10\Frag5.isml." The request specifies a host with "CDN\media," a channel with "\Event\AO9382," a quality level with "\Cap10," and a fragment index with "\Frag5.isml"

Fragment requests 150 provide a visual abstraction of the requests for particular fragments within encoded fragments 145 that can be generated based on the schema provided in manifest data 125a. A fragment request is represented by an inverted sawtooth icon, which is complementary to the sawtooth icons in encoded fragments 145. A group of inverted sawtooth icons with the same fill pattern visually depicts requests for fragments corresponding to a particular encoding of segments of media content 105. Fragment requests 150 include inverted sawtooth icons with three different fill patterns (crosshatching, dotted, and vertical lines), similar to encoded fragments 145. As with encoded fragments 145, crosshatching corresponds to a request for a fragment with a CVBR cap of 10 Mbps, dotted corresponds to a request for a fragment with a CVBR cap of 7 Mbps, and vertical lines corresponds to a request for a fragment with a CVBR cap of 3 Mbps.

The complementary shape of the inverted sawtooth and sawtooth icons, together with the correspondence of fill patterns, represent the baseline one-to-one correspondence between the fragment requests 150 as defined by the schema in manifest data 125a, and the encoded fragments 145. In other words, each distinct URL generated in accordance with the schema in manifest data 125a corresponds to a different encoded fragment. As will be explained below, deviation from this one-to-one correspondence between requests and encoded fragments allows quality improvements, and in some implementations, reduced storage and content delivery system requirements.

Viewer device 120a transmits a request to view a live stream of media content 105, at time 1 corresponding to 12:00 AM. In response, media server 110 provides manifest data 125a to be used to request fragments from among encoded fragments 145 for playback of the live stream. When manifest data 125a is provided, only fragment 1 of encoded fragments 145 might be available for playback. The format for requests for fragments 2-4 is detailed in manifest data 125a, but those fragments might not exist at 12:00 AM because they are expected to be generated in the future as the live stream of media content 105 progresses during the live event. Fragments corresponding to portions of the live event occurring in the future have yet to be encoded, and have unknown (stochastic) fragment characteristics. Thus, the schema in the manifest data is capable of identifying both encoded and presently unencoded fragments.

At 3:00:02 AM (two seconds past 3:00 AM at time 2), viewer device 120b transmits a request to view the same live content. This results in media server 110 providing the same manifest data 125a. Viewer device 120b then uses manifest data 125a to request fragments for playback of the live stream.

In connection with or shortly after encoding of fragments for the different quality representations, media server 110 identifies instances in which a higher quality fragment falls within the constraints (e.g., cap value) of a lower quality encoding. In some implementations, when detecting the occurrence of such an instance, storage and distribution of the higher quality fragment is performed using locations, index numbers, and filenames corresponding to the lower quality fragment.

In other implementations, when media server 110 identifies instances in which a higher quality fragment falls within the constraints (e.g., cap value) of a lower quality encoding, media server 110 generates or updates request resolution data 155. Request resolution data 155 explicitly establishes the relationship between the higher quality fragment and the request for the corresponding fragment from the lower quality representation. In such implementations, when media server 110 receives a request for a fragment from viewer devices 120a and 120b, it determines if any request is for a fragment requiring request resolution.

Request resolution data 155 (which is one or more markup files or other types of data structures, data provided over an API, etc.), is periodically updated when fragment server 140 outputs newly encoded fragments as media content 105 progresses. Updates to request resolution data 155 occur independently of updates to manifest data 125a.

The relationship between a particular fragment request and a particular fragment provided in response to the request is visually represented by the complementary pairings of the inverted sawtooth icons of fragment requests 150 and the sawtooth icons of encoded fragments 145. The relationship between sawtooth icons of different encodings is explicitly described by request resolution data 155. In other implementations, the relationship may be implicit, such as when the higher quality fragment is stored and propagated through a content delivery system using locations, filenames, and indexing that correspond to the lower quality fragment, and thus request resolution data 155 is not required. It is noted that while FIG. 1 is presented in the context where the relationship is explicitly described, as indicated by request resolution data 155, other details of the depicted example are applicable to implementations in which the relationship is implicit.

A complementary pairing where the fill patterns are dissimilar represents deviations from the baseline one-to-one correspondence. Such a deviation represents an instance where a higher quality fragment can be provided without exceeding (or at least with an acceptably low likelihood of exceeding) network delivery or client resource limitations represented by the fragment request.

As an example, fragment 146 is provided in response to requests corresponding to two different fragment requests. This is indicated by the 2:1 relationship in request resolution data 155, as illustrated by fragment grouping 116. Fragment 146 corresponds to encoding at CVBR capped at 10 Mbps, with segment index 3. Consistent with the schema of manifest data 125a, this fragment 146 is provided in response to a request for a fragment with segment index 3 from a representation encoded with quality parameters corresponding to CVBR capped at 10 Mbps. Fragment 146 is also provided in response to a request for a fragment with segment index 3 from a representation encoded with quality parameters corresponding to CVBR capped at 7 Mbps. Thus, request resolution data 155 causes one request to be fulfilled with a quality higher than requested, as illustrated by fragment 131a. Fragment 131a, one of the fragments within provided fragments 130a, has a crosshatched sawtooth icon paired with a dotted inverted sawtooth icon. Thus, fragment 131a is an instance where the viewer device 120a requests a fragment with a quality corresponding to CVBR 7 Mbps, but instead receives a fragment with a higher quality of CVBR 10 Mbps.

As a second example, fragment 147 is provided in response to three different fragment requests. This is indicated by the 3:1 grouping in request resolution data 155, as illustrated by fragment grouping 117. Fragment 147 corresponds to the fragment encoded with CVBR capped at 10 Mbps, with segment index 5. Fragment 147 is provided in response to a request for a fragment with segment index 5 from a representation encoded with quality parameters corresponding to CVBR capped at 10 Mbps. Fragment 147 is also provided in response to a request for a fragment with segment index 5 from a representation capped at 7 Mbps, and in response to a request for a fragment with segment index 5 from a representation capped at 3 Mbps. Thus, request resolution data 155 causes two requests to be fulfilled with a quality higher than requested. One of these requests is fulfilled with a quality level that is two levels higher than the quality level requested, as illustrated by fragment 131b. Fragment 131b, one of the fragments within provided fragments 130b, has a crosshatched sawtooth icon paired with a vertical line filled inverted sawtooth icon. Thus, fragment 131b is an instance where the viewer device 120b requests the fragment from a representation with a quality corresponding to CVBR 3 Mbps, but instead receives a fragment with a higher quality of 10 Mbps. Put alternatively, request 152, defined with the query "CDN\Media\Event\AO9382\Cap3\Frag5.isml," is treated similarly to request 151, defined with the query, "CDN\Media\Event\AO9382\Cap10\Frag5.isml."

Media server 110 updates request resolution data 155 with an n:1 grouping when detecting instances where for a particular segment, a higher quality fragment falls within the constraints associated with a lower quality representation. Fragment 146, encoded with a capped value of 10 Mbps, has a peak bit rate of 6.3 Mbps, which is lower than the 7 Mbps cap value associated with a lower quality representation. Media server 110 identifies the condition, and updates request resolution data 155 accordingly. The update can take various forms, such as software methods including assigning a responsive pointer, creating fields in a lookup table, or defining an address translation. Updates occur as encoding server 140 generates encoded fragments.

In the absence of information from viewer device 120a that higher than requested quality levels are not supported, the update of request resolution data 155 causes the request for fragments from the lower quality level to be provided with the higher quality level associated with fragment 146.

Figure 2:
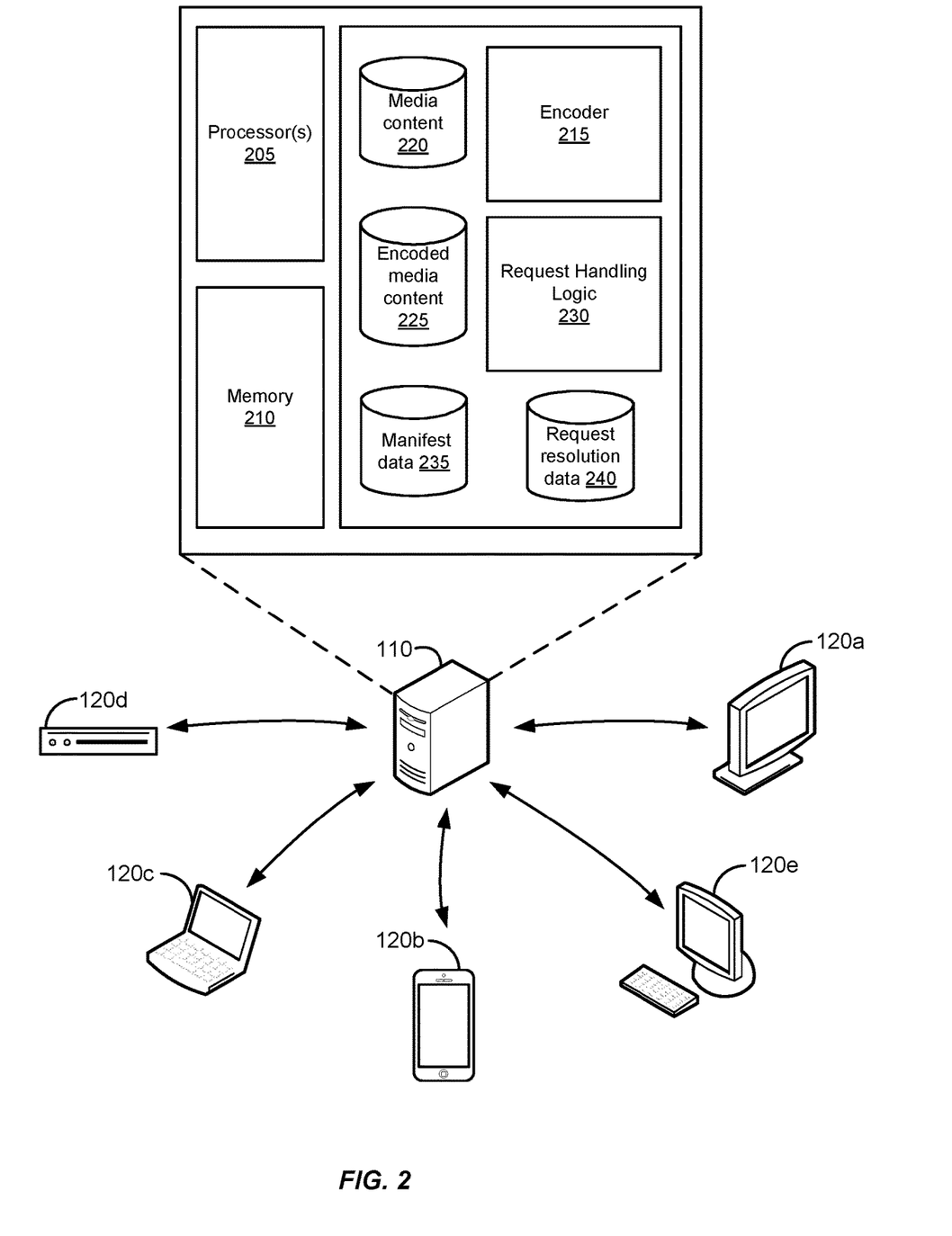
FIG. 2 illustrates an example of a computing environment providing live streaming media content.

FIG. 2 illustrates an example of a computing environment providing live streaming media content using media content manifest data and request resolution data. The computing environment of FIG. 2 includes media server 110 that provides manifest data to viewer devices 120a-e so that they can request and receive fragments of live streaming media content. Viewer devices 120a-e can include smartphones, televisions, laptop computers, desktop computers, set-top boxes, video game consoles, tablets, wearable devices, virtual reality headsets, and other electronic devices.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Media server 110 may be part of a content delivery system that conforms to any of a wide variety of architecture. The functionality and components of media server 110 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content and data related to the media content, including content providers, internet service providers (ISPs), providers of content delivery networks (CDNs), etc. The functionality described herein may also be implemented by one or more of different entities. For example, the functionality can be implemented in an edge server or content server of a CDN, a server of an ISP, etc.

In some implementations, media server 110 can include one service using one or more servers to provide manifest data to viewer devices 120a-e and they may request fragments from another service using one or more of the same or other servers of media server 110, such as an edge server of a CDN, based on the manifest data provided by the first service.

In FIG. 2, viewer devices 120a-e include various types of logic used to implement a video player to provide playback of media content. Viewer devices 120a-e can include one or more processors, memory, a display, and other hardware components or circuits to request manifest data and fragments of media content to store in a playback buffer. For example, viewer devices 120a-e can include processors that can execute stored instructions in memory to implement parts of the techniques disclosed herein, such as making fragment requests based on the manifest data, or extracting metadata describing fragment characteristics.

Media server 110 includes one or more processors 205, memory 210, and other hardware components or circuits to provide manifest data to viewer device 120a-e so that they can request fragments for playback of a live stream. Processors 205 and memory 210 can receive video and audio data corresponding to a live event in media content 220 and implement encoder 215 to generate fragments at various quality levels. In some implementations, encoding can occur remotely from media server 110, such as fragment server 140.

Request handling logic 230 generates manifest data and stores manifest data in manifest data store 235. Request handling logic 230 also generates and updates request resolution data and stores request resolution data in request resolution data 240. Request handling logic 230 provides manifest data to a viewer device upon request for playback, receives requests for fragments, performs any request resolution defined in request resolution data as previously discussed, and then provides the corresponding fragments to the viewer device. As will be understood, processors 205 execute stored instructions in memory 210 to implement these and other techniques disclosed herein.

Figure 3:
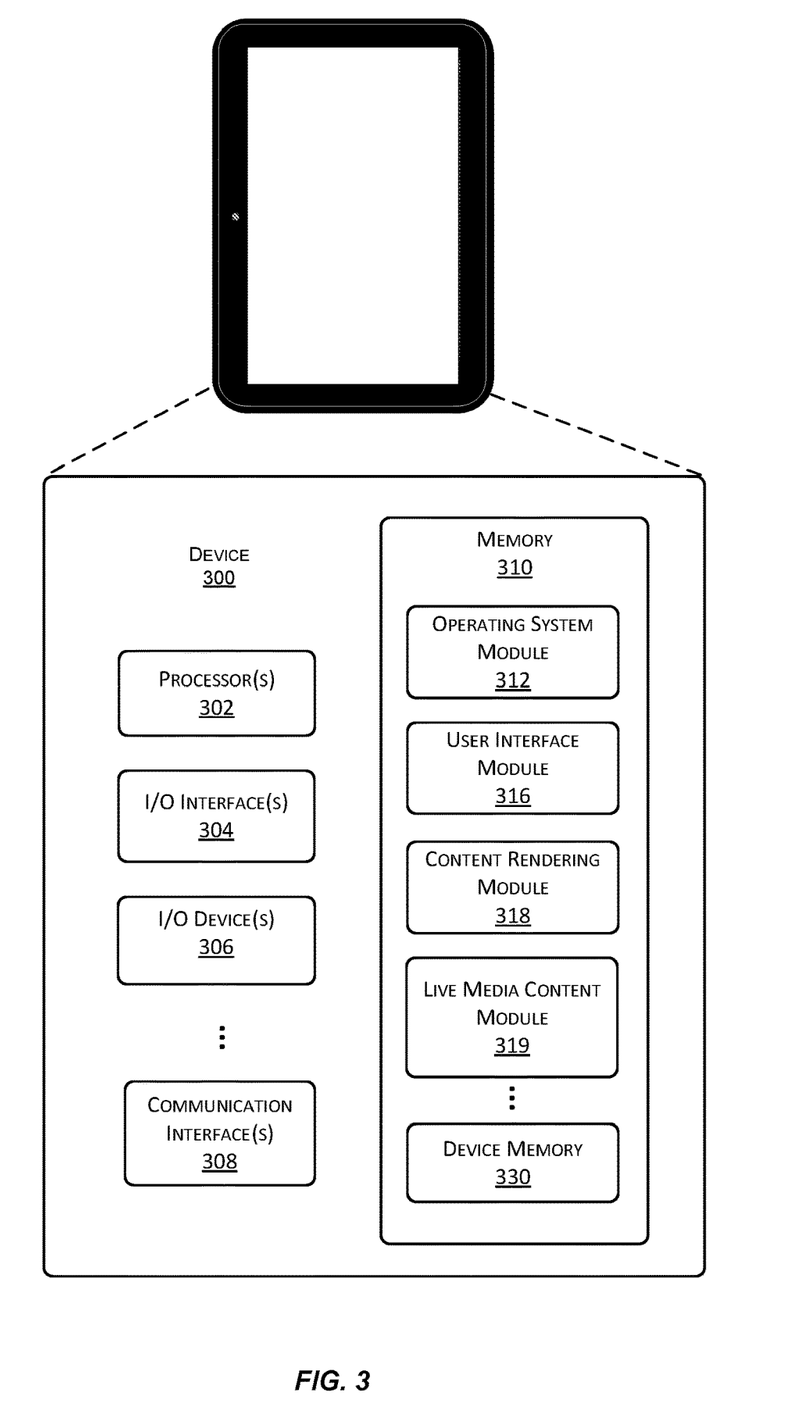
FIG. 3 illustrates an example of a viewer device configured to consume live streaming media content.

A block diagram of an example of a client device 300 suitable for use with various implementations is shown in FIG. 3. Device 300 includes one or more single or multi-core processors 302 configured to execute stored instructions (e.g., in device memory 330). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface, and so forth. I/O interface(s) 304 is coupled to one or more I/O devices 306. I/O device(s) 306 may include one or more displays, one or more haptic generators, a touch sensor array, one or more accelerometers, one or more image capture systems, one or more motion sensors, one or more orientation sensors, microphones, speakers, and so forth.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 300 also includes one or more buses or other internal communications hardware or software (not shown) that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, and other modules. Memory 310 also includes device memory 330 to store a wide variety of instructions and information using any of a variety of formats including, for example, flat files, databases, linked lists, trees, or other data structures. In some implementations, a portion of device memory 330 may be distributed across one or more other devices including servers, network attached storage devices, and so forth.

At least some of the logic or computer program instructions used to support live streaming media content as described herein (represented by live media content module 319) may be resident on client device 300. For example, at least some of this functionality may be implemented as part of the code of a media player operating on device 300. Alternatively, live media content module 319 may be implemented separately from the device's media player. Suitable variations and alternatives will be apparent to those of skill in the art. It will also be understood that device 300 of FIG. 3 is merely an example of a device with which various implementations enabled by the present disclosure may be practiced, and that a wide variety of other devices types may also be used. The scope of this disclosure should therefore not be limited by reference to device-specific details.

Some of the implementations enabled by the present disclosure contemplate logic resident on the client devices consuming live media content; such logic being configured, for example, to extract information, make decisions, and/or present information in conjunction with manifest data (e.g., determining the correct format for a fragment request), or metadata attached or embedded within a received fragment. The logic might be part of an existing algorithm or module on the client device or implemented to work in conjunction with such an algorithm or module. The logic might be implemented, for example, in a media player on the client device or as a separate application or module resident on the client device.

For example, such logic might perform extraction and processing of metadata embedded within a received fragment with index n. According to some implementations, such metadata might include, for example, stochastic fragment characteristics, such as file size, for the available fragments with index n+1 for each of the different encodings represented in the manifest data. The client logic might use such extracted information to determine which of the available fragments with index n+1 provide the highest quality playback experience consistent with network and buffer limitations at the viewer device.

In implementations where the fragment encoder uses a variable fragment or "group of pictures" (GOP) length, the embedded metadata extracted by a viewer device can include the duration for the fragments with index n+1. Typical multimedia compression methods (like HEVC or H.264) are based on differential compression. A video stream is split up into groups of consecutive images (i.e., a group of pictures, GOP). The first image in a GOP is processed as a whole frame, and is referred to as an I-frame. Consecutive images are compared to that first image and only changes relative to the first frame are processed, resulting in, for example, B-frames. Certain media content may exhibit minimal change for seconds or minutes at a time. Fixed GOP lengths will then result in superfluous data from unnecessary I-frames when there is no motion, and large B-frames containing full images when there is a lot of motion. A variable GOP length (VGL) adjusts to the media content so that frames that should be encoded together are grouped, making encoding more efficient and thereby saving bandwidth and storage capacity.

Fragment length (GOP length) information can be provided from the media server to a viewer device through a variety of signaling mechanisms. For a fixed length, fragment length can be specified in manifest data that is initially provided in response to a request for playback. For a variable fragment length, the fragment length for the fragment with index n+1 can be embedded in metadata attached to, or embedded within, the preceding fragment with index n. Such metadata acts as a mini manifest, or a manifest update, that together with the initial manifest data, emulates static manifest data for non-live streaming or live streaming pre-recorded content. As a result, viewer device 300 can request the highest quality fragment within network bandwidth and buffer constraints, irrespective of the presence of adaptive streaming capabilities at the media server. Live media content module 319 provides the logic on device 300 to use both the initial manifest data and the embedded metadata to generate such requests. In implementations using variable GOP lengths within a narrow range, a viewer device can assume a fragment is the longest duration, thereby eliminating the need for embedded metadata.

In implementations using variable GOP lengths, live media content module 319 can calculate the byte code or byte range to be used in the place of a fragment index when generating the URL for a fragment request. Even in implementations using fixed GOP lengths, byte code or byte range values can be used to accommodate for the stochastic fragment characteristics of either VBR or CBR encodings. For example, CBR encoded fragments exhibit a small amount of stochasticity (i.e., the average bit rate deviates from the target constant bit rate within a small range), whereas VBR encoded fragments exhibit a large amount of stochasticity (i.e., the average bit rate is any value below a cap value). By providing embedded metadata describing the precise size of a subsequent encoded fragment, a viewer device can specify a fragment (e.g., by specifying a fragment byte range) that maximizes quality given bandwidth and buffer constraints.

Figure 4:
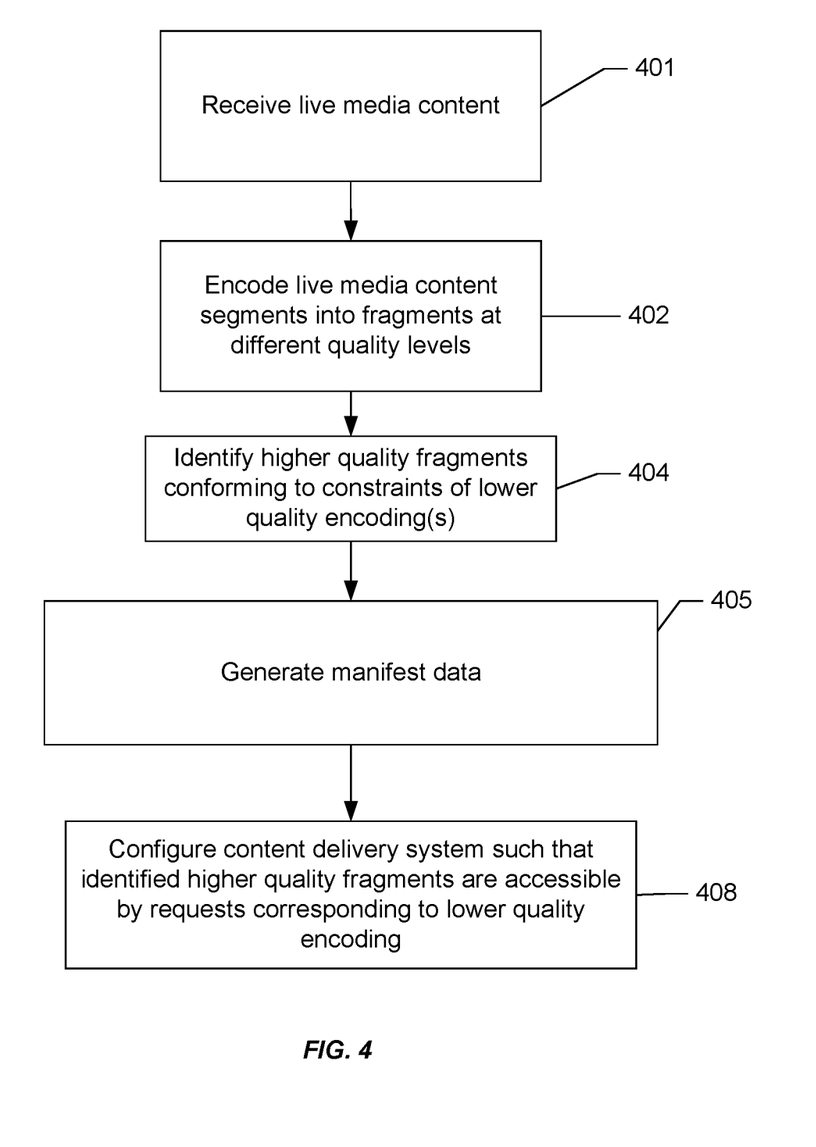
FIG. 4 is a flowchart illustrating an example of server operations for live streaming media content.

FIG. 4 is a flowchart illustrating server operations for live streaming of VBR encoded media content. As live media content is recorded, a server receives the media content and generates segments of media content (401). The segments are then encoded at various video quality representations (e.g., CVBR cap levels 10, 7, 3 Mbps), generating encoded fragments (402).

The media server determines instances where a higher quality encoded fragment conforms to constraints associated with lower quality representations (404). For example, with reference to FIG. 1, fragment 146, encoded with a capped value of 10 Mbps, has an encoded output peak bit rate of 6.3 Mbps. Media server 110 determines that fragment 146 is smaller than the 7 Mbps constraint of a lower quality representation. In some implementations, a higher quality encoded fragment conforms to constraints associated with lower quality representations by exceeding a threshold value.

Manifest data for requesting the encoded fragments is generated (405). As an example, manifest data provides the schema for requesting fragments from three different representations, such as the three different CVBR cap values of 10, 7, and 3 Mbps. In certain implementations, additional manifest data can be generated for each recently encoded fragment and embedded in the fragment with the immediately preceding index value.

In some implementations, the schema provides more granularity than the number of encoding representations. For example, rather than having URLs specify the CVBR cap value, which is a deterministic constraint, URL primitives for other implementations can use approximate stochastic fragment characteristics, such as peak bit rate or target fragment sizes. For example, a set of five peak bit rates ranging from 1 to 10 Mbps in step sizes of 2 provides a 3 to 5 correspondence between available representations and available request values. Certain representations are mapped to multiple request values. In such implementations, the viewer device can convey to a media server with greater granularity network bandwidth and buffer constraints. In turn, a media server can provide a mapping of a fragment from a particular representation that best matches the network bandwidth and buffer constraints (e.g., the largest fragment that does not exceed bandwidth/buffer constraints). Thus, the manifest data in the techniques disclosed herein allows an arbitrary degree of granularity in the number of discrete request values, relative to the number of encoded representations. Furthermore, the manifest data allows the request URL to specify fragment variables (e.g., fragment sizes or other stochastic fragment characteristics) that are not identical to encoding parameter constraints (e.g., cap values or other deterministic constraints).

In certain implementations, the same manifest data is provided to viewer devices having different capabilities, such as different supported frame sizes, bit rates, absolute screen size, frame rates etc. In other implementations, manifest data can be dynamically generated with respect to characteristics of a viewer device requesting playback of media content. For instance, a viewer device providing a device ID that specified that the viewer only supports frame sizes equal to or lower than 1280×720 would not receive manifest data that describes locations of fragments with resolution of 1080P/i. As another example, if a viewer device with a device ID that specifies a small built-in screen size provided contextual information to a media server that the viewer device was connected to a projector, the media server can generate manifest data including representations appropriate for the large display sizes associated with projectors. As yet another example, if a viewer device has a device ID that specifies limited battery life, the viewer device can signal to a media server that it is currently connected to a DC charging source, and therefore the media server can generate manifest data including representations requiring high power consumption costs that would normally not be available if the viewer device were running only on battery power. Therefore, in such implementations, manifest data is static with respect to segments of media content that have yet to be encoded, but is dynamic with respect to characteristics of a viewer device requesting playback of segments of media content. However, the manifest data can be dynamic with respect to both characteristics of a viewer device and with respect to segments of media content that have yet to be encoded. For instance, in implementations where additional manifest data can be generated for each recently encoded fragment and embedded in the fragment with the immediately preceding index value, fragment requests can have associated viewer device capabilities used to filter the representations to include in the embedded manifest data.

Information on the capabilities of a viewer device can be provided to a media server using a variety of signaling mechanisms. In some implementations, information on the capabilities of a viewer device can be signaled using parameters in an HTTP request for encoded fragments. For instance, a flag field indicates whether or not variable bit rates and variable resolutions (i.e., frame sizes such as 1080P, 720P, etc) are supported, or if only one resolution but variable bit rates (i.e., 1080i, 1080p) are supported. In other implementations, information about the viewer device can be signaled by providing a device ID, and a media server can look up viewer device capabilities (e.g., absolute screen size, supported bit rates, supported resolutions) in a reference database. In certain implementations, a media server queries the viewer device for information regarding capabilities or configurations, such as requesting the current window size.

The initial manifest data provided in response to a playback request, and if present, the manifest data embedded in a fragment, contains information corresponding to different representations of the same segments of media content. In some implementations, the quality level associated with each representation included in the manifest data corresponds to the constraints used to generate the representation, such as the specific CVBR cap value. In other implementations, other quality metrics can be used, such as signal-to-noise ratios and mean squared error values, etc. In further implementations, quality metrics are based on visual perception models such as video quality metric (VQM), motion-based video integrity evaluation (MOVIE), Sarnoff JND, and Video Multimethod Assessment Fusion (VMAF).

In implementations where the quality metric directly corresponds to the value of an encoding parameter, there is a relationship between the encoding parameter and the quality associated with a fragment from the representation using the encoding parameter. For example, in a system using the three different frame sizes of 480P, 720P, and 1080P, increasing frame size is treated as corresponding to increasing quality.

In other implementations, the logic for selecting the fragment to provide to a viewer device may account for factors other than or in addition to encoding parameters (e.g., CVBR cap values, frame sizes (resolutions), frame rates, etc.) and visual perception model outputs (e.g., VMAF values). For instance, determining the fragment to be provided can account for a combination of the frame resolution and screen size of the viewer device requesting the fragment.

Specifically, a first viewer device with an 80 inch screen may request a representation having a resolution of 1080i because network and buffer conditions permit such a request, and because the first viewer device assumes a higher resolution corresponds to higher quality. However, the media server can account for how the degrading effects of motion blur are more severe with larger screens, and thus provide a 720p representation rather than the 1080i representation that was requested.

A second viewer device with an 8 inch screen may request a representation having a resolution of 1080i. The media server, since the degrading effects of motion blur are less severe with smaller screens, provides a 1080i representation as requested. Thus, despite both viewer devices having the network and buffer conditions supporting the representation with the highest resolution (1080i), the actual resolution of the fragment provided will differ based on client device screen size.

The disclosed techniques provide the highest quality representation that fits within the network and buffer conditions identified by a viewer device when requesting a particular representation. The identified network and buffer conditions may be explicitly described in a request (e.g., a particular field in the HTTP request), or may be implicitly derived from the request (e.g., based on the frame resolution requested, and a known GOP length, the minimum network bandwidth and buffer capacity at the viewer device are derived). The quality level associated with the fragment within each representation of the same segment of media content can be based on a variety of quality metrics. In some implementations, the quality level corresponds to an encoding parameter, such as CVBR cap value, frame size, or frame rate. In other implementations, the quality level corresponds to a quality metric derived from a visual perception model, such as a function that is curve fitted to a database of subjective quality assessments for a range of encoding parameters (e.g., bit rates and resolutions) and source characteristics (e.g., animation, TV drama, high noise).

In yet further implementations, the quality level associated with a fragment from a particular representation can be weighted based on information including viewer device characteristics. For example, both a system that uses frame resolution to determine quality level, and a system that uses the VAMF model to determine quality level, may result in a determination that a 1080i fragment has a higher quality level than a 720P fragment. However, the 1080i fragment and the 720P fragment can each be weighted based on viewer device information, such as information relating to screen size, such that the 1080i fragment has a lower quality level than the 720P fragment. In such instances, when the viewer device with a large screen size requests the 1080i fragment, the viewer device will get the highest weighted quality, but not necessarily the highest unweighted quality. Therefore, relative to implementations that are agnostic to viewer device characteristics, weighting based on viewer device characteristics can be viewed as acting as a filter to eliminate certain representations that would otherwise be available in the manifest data or be candidates for the highest quality fragment. In other words, network and buffer conditions identified by a fragment request may serve as initial criteria to filter out certain fragments as candidates for the highest quality fragment to provide in response to a request. Furthermore, viewer device characteristics may provide an additional layer of filtering that eliminate certain representations. The highest quality fragment, based on encoding parameters such as CVBR cap, or based on visual perception models, or some combination of the two, may then be determined out of the remaining eligible fragments.

It is noted that throughout the specifications, unless otherwise noted, reference to the quality of a fragment contemplates implementations where weighting is either applied or not applied. For example, in implementations where weighting is not applied, the highest quality fragment refers to the fragment with the highest quality level based on encoding parameters or visual perception models, or some combination of the two. In implementations where weighting is applied, the highest quality fragment refers to the fragment with the highest weighted quality (i.e., without explicit mention of the weight modifier), which is not necessarily identical to the highest unweighted quality for a particular viewer device.

In certain implementations, the manifest data provided to a viewer device can be simplified. Specifically, rather than describe a plurality of representations, the manifest data might provide only the indexing scheme. The viewer device can then format requests in accordance with the indexing scheme, along with specifying network and buffer conditions, together with viewer device capabilities. The media server can then apply the constraining network and buffer conditions identified by the request, along with the viewer device capabilities, to derive the highest quality fragment to provide for the requested fragment index value.

For each detected instance, where a higher quality encoded fragment conforms to constraints associated with lower quality representations, the media server configures a content delivery system such that the higher quality fragments are accessible by requests for corresponding fragments from lower quality representations (408). In some implementations, such configuring involves generating or updating request resolution data (e.g., data 155 of FIG. 1). In such an instance, where fragment mappings are explicit, only storage and distribution of the higher quality fragment is required. Thus, network resources are not consumed by storage or distribution of the lower quality fragment.

In other implementations, such configuring of the accessibility of the higher quality fragment involves storage and distribution using locations, index numbers, and filenames corresponding to both the lower quality fragment and the higher quality fragment.

Figure 5:
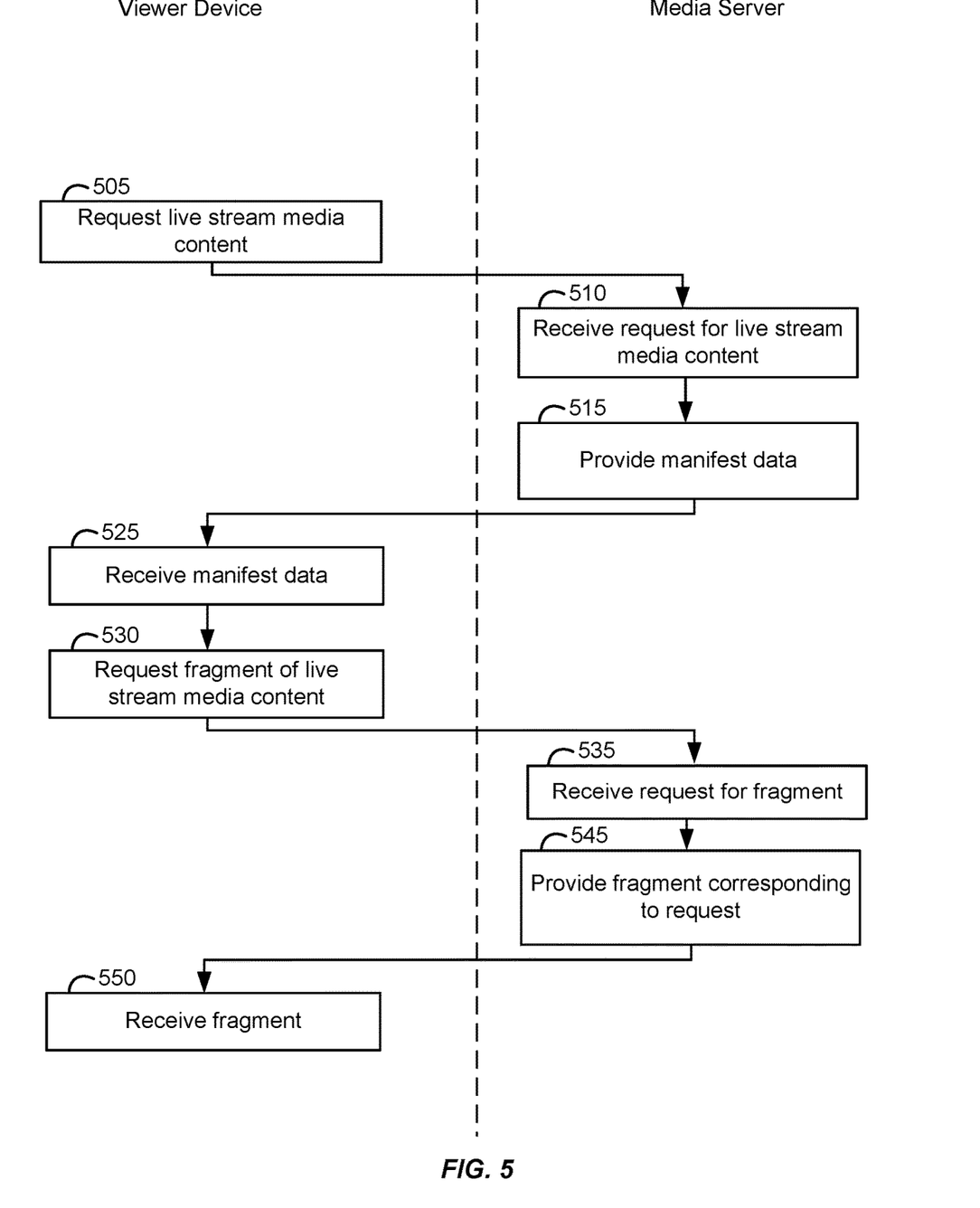
FIG. 5 is a flowchart illustrating an example of server and client operations to service a request for live streaming media content.

FIG. 5 is a flowchart illustrating the delivery of live streaming media content. A viewer device requests media content by selecting playback of live media content (505), e.g., in a user interface of a media player or a browser. A media server receives the request (510) and provides manifest data (515). The viewer device receives the manifest data (525) and requests a fragment of the live media content using a format in compliance with the manifest data (530). The media server receives that request (535) and transmits a corresponding fragment to the viewer device (545). As enabled by the present disclosure, at least some requests from the viewer device are fulfilled with fragments from a representation with a quality higher than requested, which allows a higher quality playback experience without exceeding network or client resource limitations as specified by a viewer device. The quality improvement may be achieved by referring to explicit descriptions of fragment mappings based on request resolution data, or implicitly by storing the higher quality fragment at locations corresponding to the lower quality fragment. The viewer device can then receive that higher quality fragment (550) and store it in a buffer for playback.

In some implementations, the viewer device can extract metadata describing characteristics of the subsequent fragment. The metadata can be used to request the highest-quality subsequent fragment (as constrained by network and buffer limitations at the viewer device) without relying on quality improvements performed by the media server. That is, quality improvement capabilities at the media server, and per fragment metadata analysis capabilities at the viewer device, can be implemented independent of the other. Furthermore, the two capabilities can coexist without conflict, and a content delivery system can support a system where a portion of the viewer devices have per fragment metadata analysis capabilities, and a portion of the viewer devices do not.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity.

Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
receiving media content representing a live event while the live event is ongoing;
encoding segments of the media content while the live event is ongoing with a plurality of variable-bit-rate (VBR) encoders operating in parallel thereby generating a plurality of encodings of the media content, each encoding corresponding to one of a plurality of quality levels and including a fragment for each of the segments of the media content;
providing manifest data to each of a plurality of client devices, the manifest data indicating a URL template for generating HTTP requests that enable each client device to generate requests corresponding to the segments of the media content including future segments of the media content that have yet to be encoded;
receiving a first request indicating a first index value corresponding to a first segment of the media content from a first client device;
selecting a first fragment corresponding to the first segment of the media content and a first encoding based on one or more of a first quality level specified in the first request, a supported frame size of the first client device, a video decode buffer constraint of the first client device, or a network bandwidth associated with the first client device;
associating metadata with the first fragment, the metadata representing a set of fragments corresponding to a second segment of the media content subsequent to the first segment and including a duration of the second segment and a plurality of fragment sizes, each of the fragment sizes corresponding to one or more of the plurality of quality levels of the media content;
transmitting the first fragment to the first client device for playback while the live event is ongoing;
receiving a second request indicating a second index value corresponding to the second segment of the media content and one of the plurality of quality levels from the first client device, the second request having been generated using at least the duration of the second segment indicated in the metadata, the duration of the first segment being different from the duration of the second segment;
selecting a second fragment from among the set of fragments based on the second request; and
transmitting the second fragment to the first client device for playback while the live event is ongoing.

2. The computer implemented method of claim 1, further comprising:
establishing a correspondence between the first fragment and a second encoding, the first encoding corresponding to a first VBR cap value, the second encoding corresponding to a second VBR cap value, the second VBR cap value being lower than the first VBR cap value, wherein establishing the correspondence includes determining that a maximum bit rate of the first fragment is no higher than the second VBR cap value; and configuring a content delivery system to deliver the first fragment in response to a third request corresponding to the first segment of the media content and the second encoding.

3. The computer implemented method of claim 1, wherein one or both of the video decode buffer constraint or the network bandwidth are indicated in the first request.

4. A computer-implemented method, comprising:
receiving media content representing a live event while the live event is ongoing;
encoding segments of the media content while the live event is ongoing with a plurality of variable-bit-rate (VBR) encoders operating in parallel thereby generating a plurality of encodings of the media content, each encoding corresponding to one of a plurality of quality levels and including a fragment for each of the segments of the media content;
providing manifest data to each of a plurality of client devices, the manifest data being configured to enable each client device to generate requests corresponding to the segments of the media content including future segments of the media content that have yet to be encoded;
receiving a first request corresponding to a first segment of the media content from a first client device;
selecting a first fragment corresponding to the first segment of the media content and a first encoding based on one or more of a first quality level specified in the first request, a characteristic of the first client device, a processing resource constraint of the first client device, or a network condition associated with the first client device;
associating metadata with the first fragment, the metadata representing a fragment characteristic of a second fragment corresponding to a second segment of the media content subsequent to the first segment, the fragment characteristic corresponding to one of the plurality of VBR encoders; and
transmitting the first fragment and the associated metadata to the first client device for playback while the live event is ongoing.

5. The computer implemented method of claim 4, further comprising:
establishing a correspondence between the first fragment and a second encoding; and
configuring a content delivery system to deliver the first fragment in response to a second request corresponding to the first segment of the media content and the second encoding.

6. The computer implemented method of claim 5, wherein the first encoding corresponds to a first VBR cap value, and the second encoding corresponds to a second VBR cap value, the second VBR cap value being lower than the first VBR cap value, and wherein establishing the correspondence between the first fragment and the second encoding includes determining that a maximum bit rate of the first fragment is no higher than the second VBR cap value.

7. The computer implemented method of claim 4, wherein the manifest data indicate one or more templates for generating requests, each of the requests corresponding to a segment of the media content and a respective one of the plurality of quality levels.

8. The computer implemented method of claim 4, further comprising:
receiving a second request corresponding to the second segment of the media content and one of the plurality of quality levels from the first client device, the second request having been generated based on the fragment characteristic of the second fragment represented in the metadata associated with the first fragment, the fragment characteristic being at least one of a duration or a size;
selecting the second fragment from among a set of fragments corresponding to the second segment of the media content based on the second request; and
transmitting the second fragment to the first client device for playback while the live event is ongoing.

9. The computer implemented method of claim 4, further comprising:
processing the first request to determine one or more of the first quality level specified in the first request, the characteristic of the first client device, the processing resource constraint of the first client device, or the network condition associated with the first client device.

10. The computer implemented method of claim 9, wherein one or both of the processing resource constraint or the network condition are indicated in the first request.

11. The computer implemented method of claim 4, further comprising determining the characteristic of the first client device by performing a database lookup using a device identifier that corresponds to the first client device.

12. The computer implemented method of claim 4, further comprising:
receiving a second request corresponding to a second segment of the media content from the first client device, the second request corresponding to a second quality level that corresponds to a second encoding;
selecting a second fragment corresponding to the second segment of the media content based on the second request, the second fragment corresponding to one of the encodings other than the second encoding; and
transmitting the second fragment to the first client device for playback while the live event is ongoing.

13. The computer implemented method of claim 4, further comprising:
receiving a second request corresponding to the first segment of the media content from a second client device;
selecting a second fragment corresponding to the first segment of the media content and a second encoding based, at least in part, on a characteristic of the second client device, wherein the characteristic of the first client device and the characteristic of the second client device are the same, and wherein the quality level corresponding to the first encoding and the quality level corresponding to the second encoding are different; and
transmitting the second fragment to the second client device for playback while the live event is ongoing.

14. A system, comprising one or more computing devices configured to:
receive media content representing a live event while the live event is ongoing;
encode segments of the media content while the live event is ongoing with a plurality of variable-bit-rate (VBR) encoders operating in parallel thereby generating a plurality of encodings of the media content, each encoding corresponding to one of a plurality of quality levels and including a fragment for each of the segments of the media content;
provide manifest data to each of a plurality of client devices, the manifest data being configured to enable each client device to generate requests corresponding to the segments of the media content including future segments of the media content that have yet to be encoded;

receive a first request corresponding to a first segment of the media content from a first client device;

select a first fragment corresponding to the first segment of the media content and a first encoding based on one or more of a first quality level specified in the first request, a characteristic of the first client device, a processing resource constraint of the first client device, or a network condition associated with the first client device;

associate metadata with the first fragment, the metadata representing a fragment characteristic of a second fragment corresponding to a second segment of the media content subsequent to the first segment, the fragment characteristic corresponding to one of the plurality of VBR encoders; and transmit the first fragment and the associated metadata to the first client device for playback while the live event is ongoing.

15. The system of claim 14, wherein the one or more computing devices are further configured to:

establish a correspondence between the first fragment and a second encoding; and configure a content delivery system to deliver the first fragment in response to a second request corresponding to the first segment of the media content and the second encoding.

16. The system of claim 15, wherein the first encoding corresponds to a first VBR cap value, and the second encoding corresponds to a second VBR cap value, the second VBR cap value being lower than the first VBR cap value, and wherein establishing the correspondence between the first fragment and the second encoding includes determining that a maximum bit rate of the first fragment is no higher than the second VBR cap value.

17. The system of claim 14, wherein the manifest data indicate one or more templates for generating requests, each of the requests corresponding to a segment of the media content and a respective one of the plurality of quality levels.

18. The system of claim 14, wherein the one or more computing devices are further configured to:

receive a second request corresponding to the second segment of the media content and one of the plurality of quality levels from the first client device, the second request having been generated based on the fragment characteristic of the second fragment represented in the metadata associated with the first fragment, the fragment characteristic being at least one of a duration or a size;

select the second fragment from among a set of fragments corresponding to the second segment of the media content based on the second request; and transmit the second fragment to the first client device for playback while the live event is ongoing.

19. The system of claim 14, wherein the one or more computing devices are further configured to:

process the first request to determine one or more of the first quality level specified in the first request, the characteristic of the first client device, the processing resource constraint of the first client device, or the network condition associated with the first client device.

20. The system of claim 19, wherein one or both of the processing resource constraint or the network condition are indicated in the first request.

21. The system of claim 14, wherein the one or more computing devices are further configured to:

determine the characteristic of the first client device by performing a database lookup using a device identifier that corresponds to the first client device.

22. The system of claim 14, wherein the one or more computing devices are further configured to:

receive a second request corresponding to a second segment of the media content from the first client device, the second request corresponding to a second quality level that corresponds to a second encoding;

select a second fragment corresponding to the second segment of the media content based on the second request, the second fragment corresponding to one of the encodings other than the second encoding; and transmit the second fragment to the first client device for playback while the live event is ongoing.

23. The system of claim 14, wherein the one or more computing devices are further configured to:

receive a second request corresponding to the first segment of the media content from a second client device;

select a second fragment corresponding to the first segment of the media content and a second encoding based, at least in part, on a characteristic of the second client device, wherein the characteristic of the first client device and the characteristic of the second client device are the same, and wherein the quality level corresponding to the first encoding and the quality level corresponding to the second encoding are different; and transmit the second fragment to the second client device for playback while the live event is ongoing.

* * * * *